3,484,490
Patented Dec. 16, 1969

3,484,490
PRIMARY ALKYLENE DIPHOSPHINES
AND PROCESS
Ludwig Maier, Zurich, Switzerland, assignor to Monsanto Company, St. Louis, Mo., a corporation of Delaware
No Drawing. Filed Feb. 23, 1966, Ser. No. 529,245
Claims priority, application Switzerland, Feb. 26, 1965, 2,748/65
Int. Cl. C07f 9/50; C10m 1/44; C08k 1/60
U.S. Cl. 260—606.5    4 Claims

ABSTRACT OF THE DISCLOSURE

Process for making alkylene diphosphines of the formula $H_2P-R-PH_2$ by reducing an alkylene diphosphonic tetraester of the formula $(R'O)_2P(O)-R-P(O)(OR')_2$ with an alkali aluminum hydride in an inert solvent, and new alkylene diphosphines of the formula $H_2P(CH_2)_nPH_2$ where $n$ is 1 or 2.

---

The present invention relates to a process for preparing primary alkylene diphosphine of the general formula $$H_2P-R-PH_2$$

wherein R signifies a straight-chain or branched-chain alkylene group having 1–4 carbon atoms, and to novel primary alkylene diphosphines produced by the process.

Primary alkylene diphosphines are well-known only since 1959. In the reaction of $PH_3$ with fluoroolefins there are obtained besides primary and secondary phosphines in small yields primary alkylene diphosphines, such as $H_2PCF_2CF_2PH_2$, $H_2CFClCF_2PH_2$ and $H_2PCCl_2CF_2PH_2$. Tetramethylene diphosphine $[H_2P(CH_2)_4PH_2]$ and hexamethylene diphosphine $[H_2P(CH_2)_6PH_2]$ have been obtained in good yields by reduction of the corresponding alkylene diphosphonites $[(RO)_2P(CH_2)_aP(OR)_2;$ $a=3-6]$ with $LiAlH_4$. This method, however, is not applicable to the preparation of methylene diphosphine and ethylene diphosphine, because methylene diphosphonites and ethylene diphosphonites cannot be prepared by the usual reaction of O,O-diethylchlorophosphites with Bis-Grignard compounds. More recently the preparation of p-phenylene diphosphine has been achieved by reduction of p-phenylene bis-(dichlorophosphine)

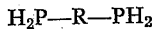

with $LiAlH_4$. Attempts to prepare methylene diphosphine and ethylene diphosphine have had no success up to now. Indications in the literature (Abstracts of Papers, 133rd ACS Meeting, San Francisco, April 1958, page 29N) teaching that in the reaction of sodium phosphide with 1,2-dichloroethane in liquid ammonia the liquid ethylene diphosphine being unstable above −78° was formed, is very doubtful since it has been found that ethylene diphosphine can be distilled at 112° under normal pressure with insignificant or no decomposition. According to what has been known from the related reaction of alkyl substituted alkali phosphides with 1,2-dichloroethane, it must be concluded that the biphosphine $[H_2P-PH_2]$ has been formed because of metal-halogen exchange. The instability of this compound is well-known.

It has now been found that primary alkylene diphosphines or obtained when an alkylene-diphosphonic tetraester of the general formula

wherein R has the significance before and R' is a lower alkyl group having not more than 8 carbon atoms, preferably not more than 4 carbon atoms, a cycloalkyl, aralkyl or aryl group having not more than 8 carbon atoms, is reduced with an alkali aluminum hydride of the general formula $$XAlH_4$$

wherein X is a sodium, potassium or lithium atom, in an inert solvent.

Examples of the groups R in the starting products and consequently also in the end products are methylene, ethylene, propylene, isopropylene, butylene, isobutylene and tertiary butylene. The ester group R'O is split off as hydroxyl compound in the reaction. The choice of the hydroxyl compound is directed by the possibility of recovery and cheapness, as well as by the ease of preparation of the starting product. In general, methyl, ethyl or isopropyl alcohol are expedient; however, cyclohexyl alcohol, benzyl alcohol, phenol or the like are also operable.

On practicing the process, the alkylene diphosphonate is slowly added to a solution or suspension, of the alkali aluminum hydride in a suitable solvent. The reaction mixture is cooled with ice and subsequently let stand for a time at room temperature, or possibly heated for a shorter period. Suitable solvents are ethyl ether, isopropyl ether, butyl ether, ethylene glycol dimethylether, tetrahydrofuran, etc. However, other inert solvents in which the alkali aluminum hydride displays the necessary reducing power, can also be used. The work up of the reaction mixture is achieved by hydrolysis with diluted hydrochloric acid, whereupon the washed and dried ether layer can be fractionally distilled in order to isolate the end product.

The products resulting from the herein disclosed process are generally liquid. They can be used as complexing agents, pyrophors and additives to rocket fuels. Methylene and ethylene diphosphines are pyrophoric and can be added to nonhypergolic hydrocarbons to yield liquid fuels, which are hypergolic at low temperatures. These two pyrophoric diphosphines can also be used as scavengers for leaded fuels and inhibitors for deposit induced ignition. Derivatives are obtained by reaction with olefins or with Mannich bases. Moreover, they are reactive intermediates for the preparation of heat transferring fluids, lubricants, additivies to lubricants, textile agents, antioxidants, stabilizers, plasticizers, complexing agents, washing agents, adjuvants for washing powders and for pesticides, such as bactericides, fungicides and insecticides.

EXAMPLE 1

To a suspension of 60 g. LiAlH (1.58 mole) in 1000 ml. of dibutyl ether are added with stirring under cooling with ice in the course of 3 hours 144 g. (0.5 mole) of methylene diphosphonic tetraethylester dissolved in 200 ml. of dibutyl ether. After standing for 36 hours at room temperature, the mixture is hydrolyzed with 1200 ml. of HCl (1:1) under cooling with ice, the ether layer is separated, washed, dried with sodium sulfate and distilled. The fraction passing over between 76° and 135° C./723 mm. of Hg is fractionated again. There are obtained 7.4 g. (19%) of methylene diphosphine as azeotrope with alcohol or dibutylether; B.P. 76–77° C./726 mm. of Hg; $P^{31}$ chemical shift + 121.8 p.p.m.

EXAMPLE 2

To a suspension of 40 g. $LiAlH_4$ (1 mole) in 1000 ml. of ether are added with stirring under cooling with ice in the course of 3 hours 100 g. of 1,2-ethylene diphosphonic tetraethylester, dissolved in 150 ml. of ether. After standing at room temperature for 36 hours the mixture is hydrolyzed with 800 ml. of HCl (1:1), the ether layer is separated, washed, dried and distilled. There are obtained 16 g. (52.7%) of 1,2-ethylene diphosphine as a colorless liquid; B.P. 114–117° C./725 mm. of Hg; $P^{31}$ chemical shift $+$ 130.8 p.p.m.; P–H absorption in the IR at 2292 cm.$^{-1}$.

*Analysis.*—$C_2H_8P_2$. Calc'd (percent): C, 25.54; H, 8.57; MG, 94.04. Found (percent): C, 25.06; H, 8.16; MG. 95.4 (from vapor density).

EXAMPLE 3

To a suspension of 50 g. $LiAlH_4$ (1.28 mole) in 1200 ml. of ether are added with stirring under cooling with ice within 3 hours 107 g. (0.377 mole) of 1,3-propylene diphosphonic tetraethylester dissolved in 200 ml. of ether. After refluxing for ½ hour the mixture is worked up as in Example 2. There are obtained 23.0 g. (56.5%) of 1,3-propylene diphosphine as a colorless liquid; B.P. 129–131° C./725 mm. of Hg; $P^{31}$ chemical shift $+$ 138.6±1.5 p.p.m.; $d_4^{20}$ 0.877; P–H absorption in the IR at 2270 cm.$^{-1}$.

*Analysis.*—$C_3H_{10}P_2$. Calc'd (percent): C, 33.34; H, 9.33; P, 57.33. Found (percent): C, 33.56; H, 9.44; P, 56.82.

EXAMPLE 4

To a suspension of 50 g. $LiAlH_4$ (1.28 mole) in 1200 ml. ether are added with stirring under cooling with ice within 3 hours 118 g. (0.3458 mole) of 1,4-butylene diphosphonic tetraethylester dissolved in 200 ml. of ether. After refluxing for ½ hour the mixture is worked up as in Example 2. There are obtained 29 g. (89.2%) of 1,3-butylene diphosphine as a colorless liquid; B.P. 64.5° C./13 mm. of Hg; $P^{31}$ chemical shift$+$137.0 p.p.m.; P–H absorption in the IR at 2270 cm.$^{-1}$.

*Analysis.*—$C_4H_{12}P_2$. Calc'd (percent): C, 39.35; H, 9.91. Found (percent): C, 38.86; H, 9.80.

The embodiments of the invention in which an exclusive property or privilege is claimed are defined as follows:

1. A process for preparing alkylene diphosphines of the general formula $$H_2P-R-PH_2$$

wherein R is a straight-chain or branched-chain alkylene group having 1–4 carbon atoms, comprising reducing an alkylene diphosphonic tetraester of the general formula $$(R'O)_2\overset{O}{\overset{\|}{P}}-R-\overset{O}{\overset{\|}{P}}(OR')_2$$

wherein R has the significance above and R' is a lower alkyl group, a cycloalkyl, aralkyl or aryl group, with an alkali aluminum hydride in an inert solvent.

2. A process of claim 1 wherein the solvent is an ether.

3. A process of claim 1 wherein R' is alkyl having not more than 4 carbon atoms, the solvent is an ether, and lithium aluminum hydride is the reducing agent.

4. An alkylene diphosphine of the formula $$H_2P(CH_2)_nPH_2$$

wherein $n$ is 1 or 2.

References Cited

UNITED STATES PATENTS

| | | | |
|---|---|---|---|
| 2,642,461 | 6/1953 | Morris et al. | 260—606.5 |
| 2,879,302 | 3/1959 | England et al. | 260—606.5 |
| 3,031,509 | 4/1962 | Marshall et al. | 260—606.5 |
| 3,086,053 | 4/1963 | Wagner | 260—606.5 |
| 3,086,056 | 4/1963 | Wagner | 260—606.5 |

OTHER REFERENCES

Chao: Chemical Abstracts (1963), vol. 59, p. 10124(f), QDI A51.

TOBIAS E. LEVOW, Primary Examiner

W. F. W. BELLAMY, Assistant Examiner

U.S. Cl. X.R.

44—76; 149—1